Dec. 2, 1969    M. F. ROBERTS    3,481,586
MAGNETIC AQUARIUM PUMP
Filed Oct. 11, 1967    2 Sheets-Sheet 1

INVENTOR.
MERVIN F. ROBERTS
BY
*Richards and Cipelli*
ATTORNEYS

Dec. 2, 1969  M. F. ROBERTS  3,481,586
MAGNETIC AQUARIUM PUMP
Filed Oct. 11, 1967  2 Sheets-Sheet 2

INVENTOR.
MERVIN F. ROBERTS
BY
Richards and Cifelli
ATTORNEYS

United States Patent Office 3,481,586
Patented Dec. 2, 1969

3,481,586
MAGNETIC AQUARIUM PUMP
Mervin F. Roberts, Old Lyme, Conn., assignor to T.F.H. Publications, Inc., Jersey City, N.J., a corporation of New York
Filed Oct. 11, 1967, Ser. No. 674,578
Int. Cl. B01f 5/10, 5/12; F04d 25/06
U.S. Cl. 259—96       3 Claims

ABSTRACT OF THE DISCLOSURE

A centrifugal magnetic aquarium pump made wholly of nonmetallic elements for use within an aquarium tank, the pump including a volute pumping chamber, and a toroidal slave magnet for driving an impeller within the volute chamber, one planar surface of the slave magnet being selectively positionable adjacent the interior surface of a wall of the tank for being driven by an axially aligned driving magnet selectively positionable on the exterior surface of the wall.

BACKGROUND OF THE INVENTION

My invention relates to aquarium pumps and more particularly to such pumps including a magnetic slave pump positioned within the aquarium tank for circulating water through the tank.

The circulation of water in an aquarium tank is important for several reasons. First, the moving water picks up oxygen and releases carbon dioxide at the surface thus allowing an aquarist to increase the number of fish per unit quantity of water in the tank. Second, the temperature of the water throughout the tank is equalized thus encouraging the fish to occupy all zones of the aquarium tank to allow an increase in the number of fish. Third, the moving water carries organic particles throughout the tank to microscopic animals which have attached themselves to plants and gravel and to filtering devices selectively positioned in the tank to trap and remove the particles which might otherwise decay and foul the water. Fourth, the gentle movement of the water caused by the pump tends to keep plant leaves clean and also helps to keep the fish healthy by removing harmful fungi from their scales. Thus, it can be seen that an efficient and optimally positioned pump insures the well being of the fish which is the primary concern of aquarists.

Aquarium pumps known to the prior art often include electric motors immersed in the tank, having power cords passing into and through the water. These types of pumps present an electric shock hazard due to the presence of electric current carrying wires in the water. Further, since these pumps generally include metallic elements there is a possibility of an electrolytic reaction in the tank which may poison the fish. These hazards have been reduced by placing the known prior art aquarium pumps within a separate filter tank located outside the aquarium tank itself. However, this system requires tubes and siphon devices to extend from the filter tanks over the side of the aquarium tank and therefore is undesirable for several reasons; (1) the tubes may be jarred loose causing spillage, (2) the pumping system will fail if the water level in both tanks is not exactly maintained, (3) the circulation of water in the aquarium tank is limited by the position of the inlet and outlet tubes, and (4) the entire system is unsightly.

SUMMARY OF THE INVENTION

Accordingly, it is the primary object of my invention to provide an improved magnetic aquarium pump which may be placed within an aquarium tank and be driven from outside the tank, is made completely of nonmetallic parts, has no connecting wires or tubes passing over the side of the aquarium tank, and is selectively positionable anywhere within the aquarium tank for optimum water circulation.

Another object of my invention is to provide a magnetic aquarium pump which may be completely hidden from view and is a convenient source of power for operating filtering devices, aspirator devices and various toys which aquarists often use to add attractiveness to their aquarium tanks.

To accomplish these objects, in oen form, I have provided a magnetic aquarium pump arranged to be selectively positioned on the interior of an aquarium tank and to be driven by a driving motor carrying a driving magnet and selectively positioned on the exterior of the tank. The pump is of the centrifugal type and includes a housing, a rotatable slave magnet, an impeller blade rotatable with the slave magnet, an inlet port, and an outlet port. The pump is arranged to be supported within the tank so that the plane of the slave magnet is parallel to one of the walls of the tank and is parallel to and axially aligned wtih the driving magnet.

BRIEF DESCRIPTION OF THE DRAWINGS

Other objects and further details of that which I consider to be novel and my invention will be clear from the following description and claims taken with the accompanying drawings wherein:

DESCRIPTION OF THE PREFERRED EMBODIMENTS

Figure 1:
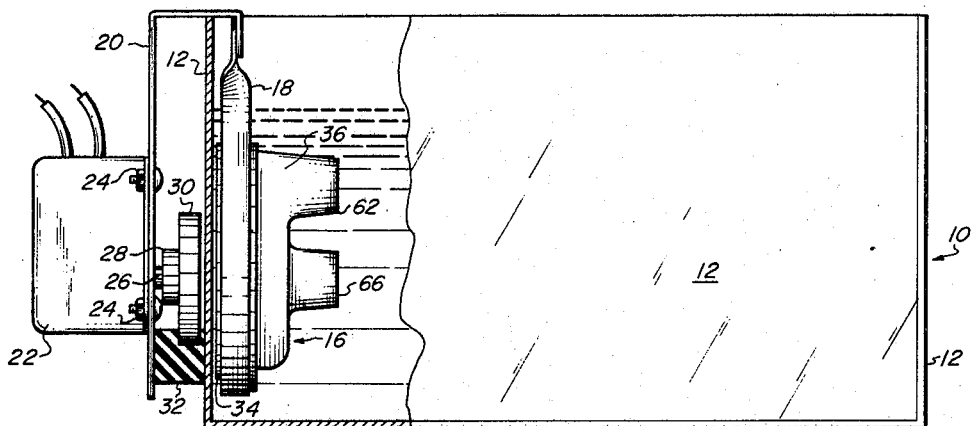
FIG. 1 is a side elevational view of a usual aquarium tank partially broken away to show my magnetic aquarium pump shown positioned against the interior surface of one side wall thereof.
Figure 2:
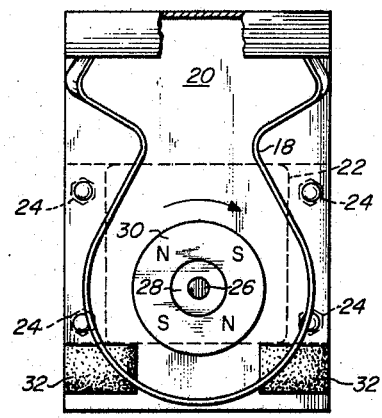
FIG. 2 is an end elevational view showing a drive motor support assembly including a pump centering strap.

With reference to the drawings there is illustrated in FIG. 1 an aquarium tank 10 having the usual glass or plastic end and side walls 12, the usual slate or glass bottom wall 14 and being filled with water to a desired level. A centrifugal pump 16 is supported within the tank 10 by means of a flexible centering strap 18 which is secured to a motor mounting bracket 20. The bracket 20 extends over one side wall 12 of the tank and supports an electric driving motor 22 on the outside of the tank. The motor 22 is secured to one side of the bracket by means of suitable fasteners 24 and includes a drive shaft 26, passing through the bracket, upon which is mounted a bushing 28 for supporting a toroidal driving magnet 30 having four poles as clearly shown in FIG. 2. Resilient vibration damping spacers 32 formed of sponge rubber or other suitable material maintain the driving magnet 30 slightly spaced from the sidewall 12.

Figure 5:
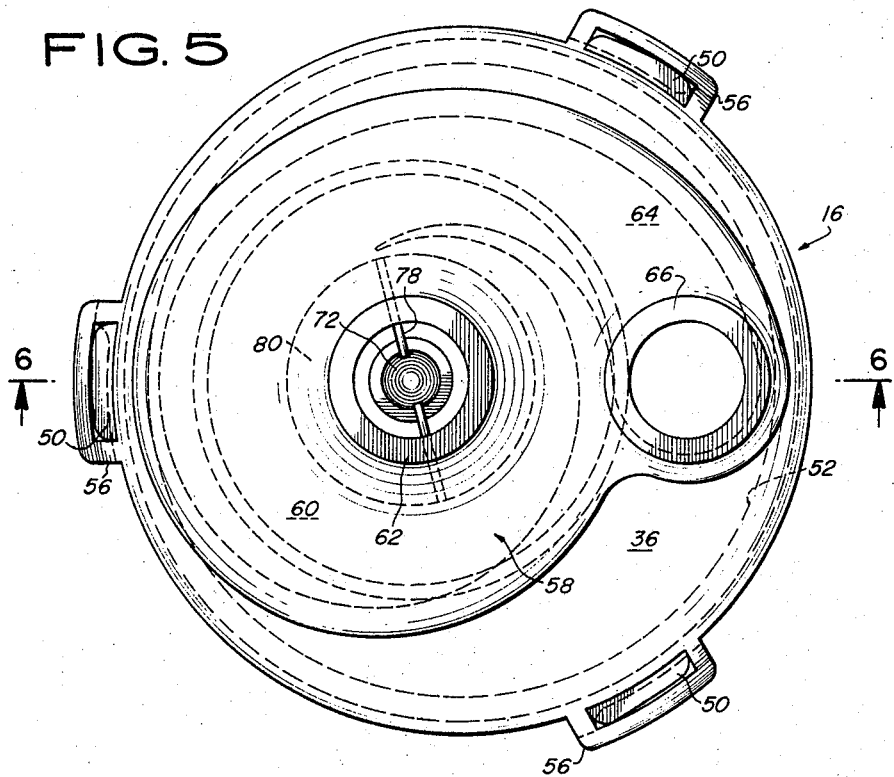
FIG. 5 is a top plan view of the magnetic aquarium pump of my invention.
Figure 6:
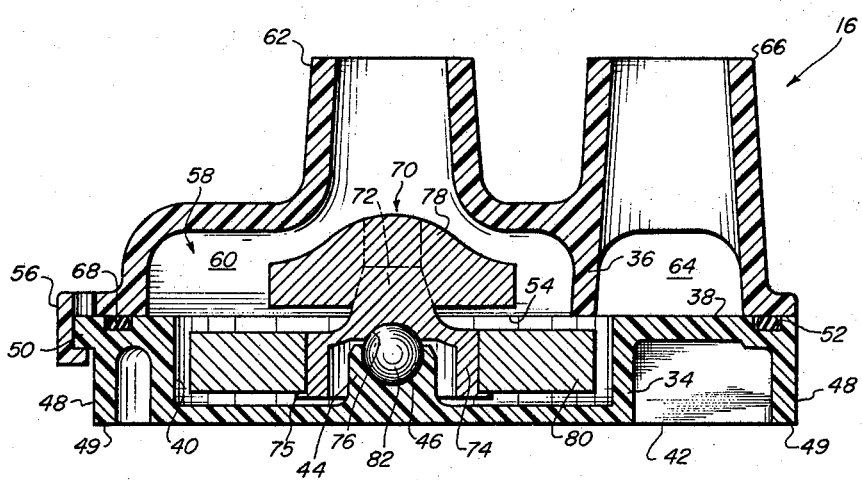
FIG. 6 is a sectional view taken substantially along line 6—6 of FIG. 5.

Turning now specifically to the structure of the pump 16 there is illustrated in FIGS. 5 and 6 enlarged views of my improved pump comprising a housing made of a suitable plastic material including a base 34 and a cover 36. The base is substantially circular having an upper planar wall 38 and includes an eccentric cup-shaped, slave magnet chamber 40 having a planar base 42 and a central axially extending post 44 defining a partial spherical cavity 46 therein. A circumferential supporting wall 48 extends from the upper planar wall 38 in the direction of the chamber 40, its rim 49 being substantialy co-planar with the planar base 42. Three equidistantly spaced radially extending locking lugs 50 are formed on the periphery of base and a circular sealing ring receiving groove 52 is defined in the upper planar wall 38.

The cover 36 is also substantially circular having a planar wall 54 with three equidistantly spaced radially extending L-shaped locking clips 56 extending therefrom. A volute chamber 58 is formed in the cover and includes an inlet portion 60 in communication with a substantially cylindrical central inlet post 62 and an outlet portion 64 in communication with a substantially cylindrical outlet post 66. The clips 56 are positioned upon the base to cooperate with the locking lugs 50 to urge the base 34 and the cover 36 firmly together and to compress an O-ring 68 disposed within the groove 52 to form a watertight joint between the two housing halves. When joined, the base and the cover must be positioned with the inlet portion 60 of the volute chamber 58 in communication with the magnet chamber 40 to form a pumping chamber.

A pump impeller assembly 70 is disposed within the pumping chamber and comprises an axial post 72 made of a suitable plastic material with a cup-shaped portion 74 at one end defining a central concavity 76 therein and a diametral impeller blade 78 at its other end. The impeller assembly further comprises a toroidal, ceramic slave magnet 80 having four, six or more poles and made of barium ferrite or other suitable material. The slave magnet is firmly mounted upon the cup-shaped portion 74 being retained by the flange 75. The impeller assembly 70 is supported for rotation upon a ball 82, made of nylon or other suitable plastic material, mounted within the spherical cavity 46 in the central axial post 44.

Figure 3:
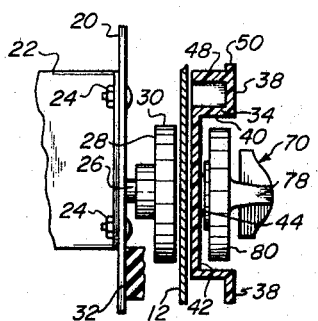
FIG. 3 is a partial end elevational view showing the driving motor assembly and the driven pump impeller assembly.

As has been described, the driving motor 22 is positioned outside of the aquarium tank 10 with the driving magnet 30 adjacent and parallel to the exterior surface of the wall 12. The pump 16 is positioned against the inside surface of the wall 12 with the planar base 42 adjacent thereto and the inlet and outlet posts 62 and 66 facing the interior of the tank. The lengths of the centering strap 18 and the motor mounting bracket 20 are respectively selected to support the pump at a desired depth in the tank and to support the motor 22 with its drive shaft axially aligned with the impeller post 72. The centering strap 18 is flexible enough to allow the pump to move laterally under the influence of the attractive forces between the driving magnet 30 and the slave magnet 80 (note FIG. 3). Alternatively, the pump may be supported adjacent the wall 12 by a single flexible rod or by a flexible tube which may also serve as an aspirator, or by any other suitable support means permitting alignment.

When the motor 22 is energized, the driving magnet 30 is rotated thereby causing the slave magnet 80 to be rotated due to the magnetic forces passing through the glass or plastic wall 12 of the aquarium tank. Rotation of the slave magnet causes the impeller blade 78 to draw water from the tank into the pump inlet post 62 and to pump it out of the pump outlet post 66 thus circulating the water in the aquarium tank.

If the pump should stall due to the presence of algae or other objects which may prevent rotation of the impeller, neither the pump nor the driving motor will burn out. The slave magnet will merely drop out of synchronization with the driving magnet. It is then easy to restart the pump by removing it from the tank and disassembling it for cleaning. Once cleaned, the pump is reassembled and returned to the tank and the magnets will again synchronize to drive the impeller.

Figure 4:
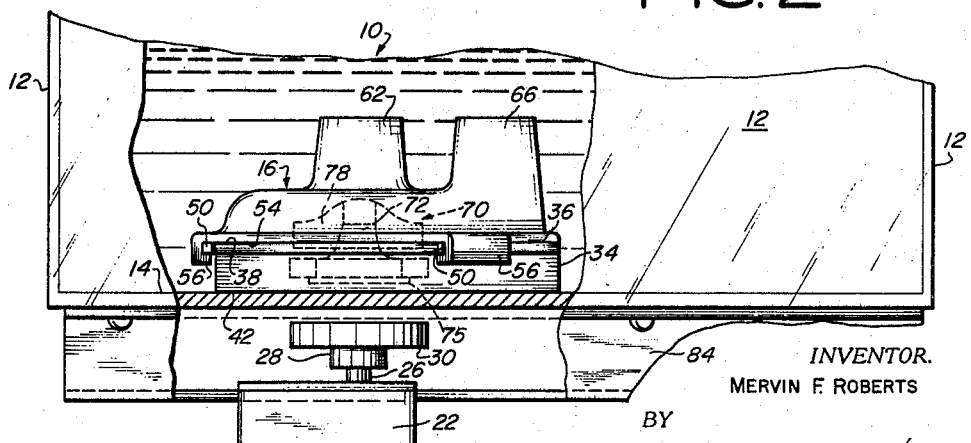
FIG. 4 is an end elevational view of a usual aquarium tank partially broken away to show my magnetic aquarium pump positioned against the interior surface of the bottom wall thereof.

In FIG. 4 I have illustrated means for positioning the pump 16 upon the bottom 14 of the aquarium tank. The driving motor 22 is mounted by suitable means upon rails 84 upon which the motor may slide. As the motor is moved along the rails, the pump 16 slides along the bottom of the tank 10 under the influence of the magnetic attractive forces between driving magnet 30 and slave magnet 80 which forces pass through the usual slate bottom or the non-magnetic better grades of stainless steel bottoms found in the better aquariums. Thus it should be readily observable that the pump 16 may be selectively positioned anywhere within the tank to an optimum position for circulating the water therein.

Having described my invention of a magnetic aquarium pump it will be readily appreciated by those skilled in this art that a pump embodying my invention is simple in design and attains the objectives set forth above. For example, I have provided a wholly non-metallic aquarium pump which may be located anywhere within an aquarium tank and may be driven by a motor located outside of the tank.

It should be understood that the present disclosure has been made only by way of example and that numerous changes in details of construction and the combination and arrangement of parts may be resorted to without departing from the true spirit and the scope of the invention as hereinafter claimed.

I claim:

1. In combination:
an aquarium tank having walls including a bottom wall;
a driving motor located outside of said tank including a drive shaft and a driving magnet mounted upon said shaft, said magnet being positioned parallel to and slightly spaced from one of said walls;
means to position said motor relative to said wall;
a centrifugal pump positioned within said tank, said pump comprising a two-part housing made of a plastic material including a base defining a cup-shaped magnet chamber therein and a cover defining a volute chamber therein, said volute chamber including an inlet portion aligned with said magnet chamber when said base and cover are joined, said pump also including a rotatable slave magnet in said volute chamber and an impeller blade positioned to be rotatable with said slave magnet in said inlet portion, said pump being supported within said tank so that said slave magnet is parallel to one of said walls and is parallel to and axially aligned with said driving magnet;
an inlet post and an outlet post formed in said cover facing the interior of said tank;
a plurality of circumferentially spaced, radially extending locking lugs on said base;
and a plurality of circumferentially spaced locking clips on said cover, with each of said clips co-operating with one of said locking lugs to firmly join said base and said cover.

2. In combination:
an aquarium tank having walls including a bottom wall and side walls;
a driving motor located outside of said tank including a drive shaft and a driving magnet mounted upon said shaft, said magnet being positioned parallel to and alightly spaced from one of said walls;
a pump positioned within said tank including a housing, a rotatable slave magnet, an impeller blade positioned to be rotatable with said slave magnet, an inlet post and an outlet post, said pump being supported within said tank so that said slave magnet is parallel to said one of said walls and is parallel to and axially aligned with said driving magnet;
a motor mounting bracket for said motor extending over one side wall of said tank;
and a flexible centering strap secured to said bracket to support said pump within said tank, said strap allowing said pump to move laterally so that said slave magnet may align itself with said driving magnet when said motor is positioned adjacent one of said walls.

3. In combination:

an aquarium tank having walls including a bottom wall;

a driving motor located outside of said tank including a drive shaft and a driving magnet mounted upon said shaft, said magnet being positioned parallel to and slightly spaced from one of said walls;

a pump positioned within said tank including a housing, a rotatable slave magnet, an impeller blade positioned to be rotatable with said slave magnet, an inlet post and an outlet post, said pump being supported within said tank so that said slave magnet is parallel to said one of said walls and is parallel to and axially aligned with said driving magnet;

rails mounted on said bottom wall on the outside of said tank;

and mounting means for said motor slidable along said rails so that said motor may be moved along said rails whereby said pump slides along the inside of the bottom of said tank due to the attractive forces between said driving magnet and said slave magnet.

References Cited

UNITED STATES PATENTS

| | | | |
|---|---|---|---|
| 2,356,784 | 8/1944 | Graham | 219—43 |
| 2,745,641 | 5/1956 | Jacobs | 103—87 |
| 3,321,081 | 5/1967 | Willinger | 103—87 |

ROBERT W. JENKINS, Primary Examiner